April 9, 1935.   J. D. COCHRANE, JR   1,997,359
LAMINATED PRODUCT AND PROCESS
Filed July 20, 1933

Inventor:
John D. Cochrane Jr.

Patented Apr. 9, 1935

1,997,359

UNITED STATES PATENT OFFICE 1,997,359

LAMINATED PRODUCT AND PROCESS

John D. Cochrane, Jr., Cincinnati, Ohio, assignor to The Formica Insulation Company, Cincinnati, Ohio, a corporation of Ohio Application July 20, 1933, Serial No. 681,386

15 Claims. (Cl. 154—2)

This invention relates particularly to laminated products having an enamel surface of permanently thermoplastic composition, and to a process of manufacturing the same.

The primary object is to provide an improved product and method, such product having an enamel surface which is highly resistant to chemicals and solvents and highly resistant to color changes.

An incidental advantage is the capability of forming the product under pressure and moderate heat in those situations where the core, or foundation-body, might be injured or destroyed by employing extreme heat and pressure.

As a thermoplastic resin, or binder, it is preferred to employ Vinylite compounded with pigments, and preferably also with transparent fillers. Any desired color may be obtained by using a white pigment, or by using colored pigments, or dyes. The use of pigments and fillers not only gives "body" to the Vinylite varnish employed, and thus enables a beautiful enamel surface to be obtained, but they also serve to prevent undue flow of the varnish and enable the laminated products to be readily hot-pressed between plates.

Preferably, use is made of an adhesive sheet for forming a bond between the surface-sheet which is treated with the Vinylite compound, and the foundation-body to which the surface-sheet and the adhesive sheet are applied. Preferably, also, the adhesive sheet is, for many purposes, impregnated with a heat-reactive synthetic resin varnish, such as bakelite. However, it is possible to apply the adhesive to the back of the enamel surface-sheet, or to apply it to the surface of the foundation-body. In any case, the surface-sheet will become securely bonded to the foundation-body in the hot-pressing operation, in which operation the surface-sheet takes on the final enamel finish. Also, in some instances, it is desirable to use, in lieu of a heat-reactive bonding resin, a thermoplastic resin which does not require too high a heat to effect quick polymerization.

The invention may be applied to production of laminated products having quite different characteristics. Examples will be given in the description which follows.

The invention may be explained with reference to the accompanying drawing, in which—

Figure 1:
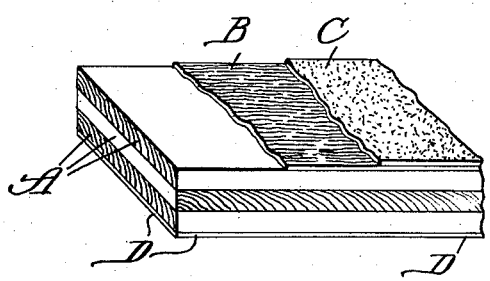
Figure 5:
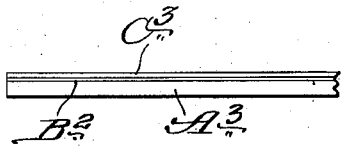
Figure 2:
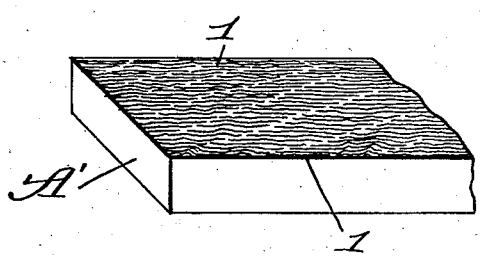
Figure 6:
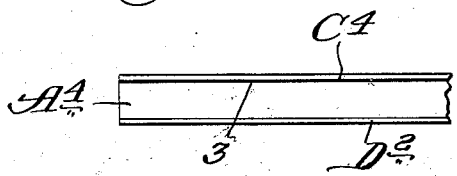
Figure 3:
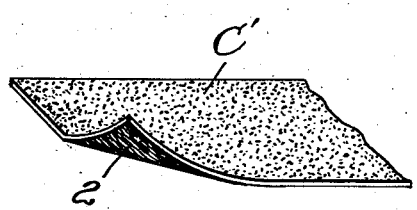
Figure 7:
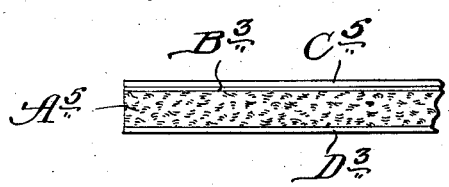
Figure 4:
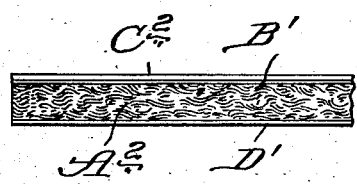
Figure 8:
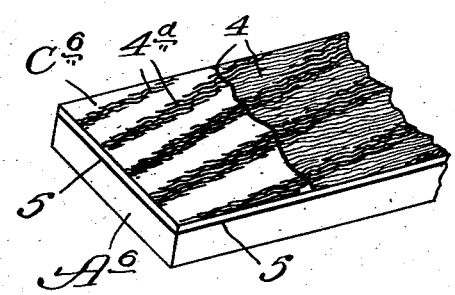

Fig. 1 is a broken perspective view of a laminated product, in which the foundation-body is composed of plies of wood, and in which the enamel surface-sheet and the underlying adhesive sheet are shown brokenly; Fig. 2, a broken perspective view showing a foundation-body having its upper surface coated with an adhesive adapted to serve as a bond between said body and an enamel surface-sheet; Fig. 3, a perspective view of an enamel surface-sheet having its lower side coated with an adhesive adapted to serve as a bond between such surface-sheet and a foundation-body which is not especially coated with an adhesive; Fig. 4, an edge elevational view of a laminated product having a soft foundation-body, such as felt, or the like, and having one surface provided with an enamel surface-sheet and a bonding-sheet, and having the other surface provided with an ordinary water-repellent sheet, which may serve as a back-surface; Fig. 5, an elevational view showing the invention applied to a sheet metal foundation-body; Fig. 6, an elevational view showing the invention applied to a laminated body, such as a laminated phenolic condensation product body, hard fibre, or the like; Fig. 7, an elevational view showing the invention applied to an asbestos composition body; and Fig. 8, a broken perspective view of a surface assembly having a decorative surface.

At the outset, it may be stated that the enamel surface may be applied to either one side or both sides of the foundation-body, depending upon whether or not an enamel finish is desired on both sides of the structure.

Vinylite is well known on the market. It is a synthetic resinoid made by polymerization of vinyl chloride, a compound ordinarily produced from ethylene. The degree of polymerization which the resinoid is given during its manufacture determines the temperature and pressure necessary to cause the resin to flow. Varnish containing the resin is available on the market, such varnish usually containing about 25% solid resin dissolved in acetone. Other ketone type solvents may be used, but acetone is the cheapest known solvent for the resin now available. The acetone varnish can be diluted to some extent with the ester type of lacquer solvents.

A typical formula for a pigment mix adapted to produce a white enamel-like surface is as follows:

| | Percent |
|---|---|
| Titanium oxide white pigment | 30 |
| Vinylite varnish (25% solids) | 55 |
| Acetone | 15 |

As indicated above, transparent fillers, such as china clay, may be added to give bulk and thereby reduce the amount of expensive colors employed. Such transparent fillers may be employed in any desired percentage, usually not exceeding 25%, however, with respect to the pigmented varnish given in the example above.

The enamel-varnish is applied to the surface-sheet in any desired manner. Usually, it is applied to one surface only of the sheet. The sheet is then dried in an oven, preferably at about 100° C. The time necessary to dry the sheet may vary, depending upon temperature. Usually, about 3½ minutes at 100° C. suffice.

Where an artificial heat-reactive resin is to be employed as a bond between the surface-sheet and the foundation-body, bakelite varnish may be selected as an example. One may employ:

| | Pounds |
|---|---|
| Bakelite varnish (50% solids) | 70 |
| Alcohol | 30 |

The bonding sheet may be impregnated with such varnish and dried in an oven. A desirable temperature is about 130° C. and the drying treatment may continue for about 2½ minutes, for example. Some reaction of the resin may occur during this drying treatment, but the resin remains potentially reactive.

Referring to Fig. 1 of the drawing, A designates a foundation-body; B, a bonding-sheet; and C, an enamel surface-sheet.

In this instance, the foundation-body is shown composed of laminated wood, or ply-wood, produced in any suitable manner. The sheet B may be assumed to have been impregnated with a heat-reactive resin, or with a suitable thermoplastic resin, such as Vinylite, or a natural resin. Such resins may be applied as a varnish and dried before the assembly is effected. The enamel surface-sheet C may be assumed to have been impregnated or coated with a pigmented thermoplastic resin varnish, produced, for example, as indicated in the formula given above. The sheet C may also be assumed to have been dried in the manner stated above. The sheets are assembled upon the foundation-body in the order illustrated. If desired, also, a backing-sheet D may be applied to the unfinished side of the foundation-body, such backing-sheet being impregnated with a bonding resin. The assembly may be pressed in a heated press, the degree of heat employed and the pressure depending upon the character of the foundation-body and the character of the bonding resin employed. In those cases where the foundation-body cannot be injuriously affected by high heat and pressure, temperatures of 130°-180° C. and pressures of 1000 lbs. per square inch, and upwardly, may be employed. The period of time required for thoroughly consolidating the laminated assembly and effecting the desired transformation of the resins employed depends, also, upon the nature of the bonding resin employed. Ordinarily, temperatures higher than 100° C. may be safely employed. Where a heat-reactive resin is employed, the curing-period may be lessened by increasing the temperature, within reasonable limits.

The process described yields a product having an enamel-like surface which is resistant to chemicals and most solvents and resistant to light. The surface produced may be as smooth as glass and ordinarily is of a rather high degree of hardness, but may be abraded or scratched by means of a hard material. On the other hand, the enamel surface will last indefinitely in those situations where it is not subjected to abrasive action.

Referring to Fig. 2, A' designates a foundation-body of any suitable material, or any suitable composition, to which has been applied a film of adhesive varnish, as indicated at 1. This varnish may be dried and the foundation-body will then be in condition to be assembled with an enamel surface-sheet, such as the sheet C shown at Fig. 1, after which the assembly may be hot-pressed.

Referring to Fig. 3, C' designates an enamel surface sheet. This may be assumed to have been coated with pigmented enamel varnish, such as has been described, and then dried; and afterwards provided on its lower side with a coating 2 of the adhesive varnish, this varnish being also dried. The sheet C' may be applied to any suitable foundation-body such as the body A shown in Fig. 1, and the assembly may then be hot-pressed to produce a laminated structure having an enamel surface.

Referring to Fig. 4 $A^2$ designates a foundation-body composed of a soft material, such as felt. This body has applied to it a suitably prepared and dried bonding-sheet B' and a superposed enamel sheet $C^2$; and if desired, may have a backing-sheet D' impregnated with a suitable adhesive. This assembly is hot-pressed to produce a consolidated laminated structure having an enamel surface.

Referring to Fig. 5, $A^3$ designates a foundation-body of sheet metal, such as steel; $B^2$ an adhesive or bonding-sheet applied to one surface of the sheet metal, and $C^3$ an enamel surface-sheet superposed on the bonding-sheet. This assembly is hot-pressed, producing a fire-resisting plate having a beautiful enamel surface.

Referring to Fig. 6, $A^4$ designates a laminated foundation-body which may consist of hard fibre, or a laminated phenolic condensation product, as desired; $C^4$, an enamel surface-sheet applied to one side of the body $A^4$; and $D^2$, a backing-sheet applied to the other surface. This assembly may be hot-pressed to produce a consolidated, laminated structure having an enamel surface. In the illustration given in Fig. 6, 3 designates the bonding-plane between the enamel surface-sheet and the laminated foundation-body $A^4$. If desired, a coating of a phenolic condensation product varnish may form the bond between the surface-sheet and the foundation-body; or the bond may be produced in any desired manner. In some cases, the laminated foundation-body may be semi-cured, and may be caused to adhere to the surface-sheets without the application of an additional bonding-adhesive.

In the modification shown in Fig. 7, $A^5$ designates a foundation-body of a suitably pressed asbestos-composition; $B^3$, a bonding-sheet; $C^5$, an enamel surface-sheet; and $D^3$, a backing-sheet, which may be of the same character as the bonding-sheet. Such an assembly may be hot-pressed to produce a fire-resistant and water-resistant plate having an enamel-like surface.

The product shown in Fig. 5, having a steel foundation-body, for example, has the advantage over the product shown in Fig. 7 that it is more compact, of lighter weight, and more easily fabricated. The metal assembly can be sheared, punched, drilled, sawed, and can be bent in moderate radius, for example 6", at room temperature, without cracking the enamel.

Composition board may be used in lieu of the laminated wood shown in Fig. 1. It may be highly compressed and of relatively uniform density, is capable of withstanding high pressures, such as 1000 lbs. per square inch, and of withstanding elevated temperatures, say 130°–180° C. The foundation-body should contain no ingredients which repel the bonding material used in the adhesive sheet, however. Resistance to moisture and delamination are desirable characteristics, but are of far less importance in assemblies of the type here described than in laminated structures employing heat-reactive material on the surface. Moreover, the improved product is less expensive than can be produced by the use of the heat-reactive resins, since it is important, where the heat-reactive resins are employed, to apply the same on both sides of the core to prevent warpage. The improved paneling can be installed by the same methods as are used for painted or lacquered wall boards, and possesses the advantage of superior finish and hard, chemically resistant surfaces.

For certain types of panel installations, a lightweight, thick core is desirable. In such cases, the consolidation can be readily effected on wood at pressures of 200 lbs.–300 lbs. per square inch, thereby avoiding undue compression of the core, or foundation-body, a difficulty which is encountered where laminating of heat-reactive materials on such bodies is attempted.

Such a structure as that shown in Fig. 4 is sound-deadening in character, and quite pliable. It may be employed where noise and vibration are to be overcome, as for example in airship fuselages, or the like.

The process described is not limited to the production of flat panels, but may be applied to irregularly shaped surfaces such as base-boards, trims, etc. In this case, the foundation-body must be pre-formed, and the surface laminations are to be then applied and consolidated with the foundation-body in a mold of desired shape.

I have discovered that Vinylite may be very advantageously employed in the manner set forth above. Substitutes may be used, but are not in all respects as desirable as Vinylite. I may mention "Plioform", a rubber thermoplastic material well known on the market; also cumar, a coal tar residue; casein; shellac, and other natural resins. Vinylite appears to have an advantage over all of these substances; particularly in its higher resistivity to chemicals.

As indicated above, any desired color may be given to the enamel surface by selecting a suitable combination of colored pigments, or a suitable combination of pigments and dyes.

If desired, the process may be modified somewhat to produce a decorative surface having thereon any suitable design. Thus, in Fig. 8, A⁶ designates a foundation-body having applied thereto a surface-sheet C⁶, in which the pigment is omitted from the varnish with which the surface-sheet is coated. In this case, the surface-sheet is coated with clear Vinylite varnish preferably containing a transparent filler, such as china clay, barium sulphate, etc., to prevent excessive flow of the varnish film. Before applying the varnish 4, however, the sheet C⁶ has printed thereon the desired design, as for example wood-graining, as indicated at 4ª. After the printing has been done, the sheet is coated and dried. It is then provided with an adhesive back-coating 5, and is hot-pressed upon the foundation-body A⁶.

The foregoing detailed description has been given for clearness of understanding only, and no undue limitations should be understood therefrom, but the appended claims should be construed as broadly as permissible, in view of the prior art.

What I regard as new and desire to secure by Letters Patent is:

1. The process of producing a laminated product having an enamel-like surface which comprises: applying to a foundation-body a surface-sheet coated with a dried varnish comprising a permanently thermoplastic resin and a pigment adapted to give body and prevent excessive flow; providing an adhesive between said surface-sheet and said foundation-body; and consolidating the assembly under heat and pressure.

2. The process of producing a laminated product having an enamel-like surface which comprises: applying to a surface-sheet varnish comprising a resinoid produced by polymerizing a vinyl halide, a pigment, and a suitable solvent; drying said surface-sheet; applying to a bonding-sheet an adhesive and drying said bonding-sheet; superposing said bonding-sheet and said surface-sheet on a foundation-body; and consolidating the assembly under heat and pressure.

3. The process stated in claim 2, as practiced by employing as said resinoid a polymerization product of vinyl chloride.

4. The process set forth in claim 2, characterized by employing as the bonding-sheet, a sheet of fibre impregnated with a heat-reactive synthetic resin varnish, said sheet being dried prior to assembling the elements.

5. The process of producing a laminated product having an enamel-like surface which comprises: applying to a surface-sheet a coating comprising "Vinylite" resin (25% solids), a pigment in desired percentage, and a solvent for said resin; drying said surface-sheet; impregnating a bonding-sheet with a varnish comprising a heat-reactive synthetic resin and a suitable solvent and drying said bonding-sheet; superimposing said bonding-sheet and said surface-sheet on a foundation-body; and consolidating the assembly under heat and pressure.

6. A laminated product having an enamel-like surface, said product comprising a surface-sheet having a coating comprising a resinoid produced by polymerization of a vinyl halide and a pigment taken in percentage approximately as great as that of the resinoid; a bonding-sheet; and a foundation-body, the whole assembly having been consolidated under heat and pressure.

7. A product as set forth in claim 6, in which the bonding-sheet contains a heat-reacted synthetic resin.

8. The process set forth in claim 1, in which the permanently thermoplastic resin is a rubber thermoplastic material, such as Plioform.

9. The process set forth in claim 1, in which the permanently thermoplastic resin is a natural resin.

10. The process of producing a decorated laminated product which comprises: printing upon a surface-sheet a decorative design; applying to the printed surface a coating comprising a polymerization product of vinyl chloride, a solvent, and a transparent filler and drying the sheet; assembling said treated surface-sheet upon a foundation-body, with a bonding-adhesive interposed between the surface-sheet and the body; and consolidating the assembly under heat and pressure to produce a clear surface-film through which the printed design is viewed.

11. A laminated product produced in the manner specified in claim 10, said product comprising a surface-sheet having a design printed thereon and a clear film comprising a polymerization product of vinyl chloride and a transparent filler, said laminated product having been consolidated under heat and pressure.

12. The process of producing a laminated product having an enamel-like surface which comprises: applying to a surface-sheet a coating comprising a Vinylite varnish and a pigment in larger amount than the solids of said "Vinylite" varnish; drying said surface-sheet; assembling said surface-sheet and a foundation-body and providing a bonding agent between them; and consolidating the assembly under heat and pressure.

13. A process as specified in claim 12, in which the bonding agent employed is a heat-reactive synthetic resin.

14. The process set forth in claim 1, in which the permanently thermoplastic resin is polymerized vinyl chloride.

15. The process of producing a laminated product having an enamel-like surface which comprises: separately coating and drying opposite sides of a fibrous surface-sheet with varnishes, one comprising a permanently thermoplastic resin and a pigment taken in such percentage as to prevent undue flow in a hot-pressing operation and the other being a bonding-varnish; applying said surface-sheet to a foundation-body having a dried adhesive coating adjacent the bonding-coating of the surface-sheet; and consolidating the assembly under heat and pressure.

JOHN D. COCHRANE, Jr.